United States Patent [19]

Balzer

[11] Patent Number: 5,592,801
[45] Date of Patent: Jan. 14, 1997

[54] MOBILE STAIR SYSTEM FOR PETS AND ANIMALS, METHOD OF MAKING SAID MOBILE STAIR SYSTEM

[75] Inventor: Karen B. Balzer, Houston, Tex.

[73] Assignee: Vector Equipment-Houston, Inc., Houston, Tex.

[21] Appl. No.: 396,544

[22] Filed: Mar. 1, 1995

[51] Int. Cl.[6] .................................................. E04B 1/00
[52] U.S. Cl. .............................. 52/741.2; 52/188; 52/171; 182/116; 182/123; 182/132
[58] Field of Search ........................... 52/182, 188, 191, 52/741.2; 182/93, 115, 116, 123, 130, 132, 151, 222, 129

[56] References Cited

U.S. PATENT DOCUMENTS

| | | | |
|---|---|---|---|
| 2,551,345 | 5/1951 | Scott | 52/191 X |
| 3,466,820 | 9/1969 | Sender | 52/188 |
| 3,706,170 | 12/1972 | Argraves et al. | 52/189 |
| 3,805,464 | 4/1974 | Hanson | 52/190 |
| 3,891,053 | 6/1975 | Burton | 182/97 |
| 4,034,525 | 7/1977 | Yokomori | 52/188 |
| 4,457,398 | 7/1984 | Loix | 52/182 X |
| 4,706,425 | 11/1987 | Brumbalough | 52/182 |
| 4,995,205 | 2/1991 | Bennett | 52/189 |
| 5,323,874 | 6/1994 | Warren et al. | 52/182 X |
| 5,369,921 | 12/1994 | Glenn | 52/182 |

Primary Examiner—Lanna Mai
Attorney, Agent, or Firm—Maryam Bani-Jamali

[57] ABSTRACT

This invention relates to a mobile stair system for pets and other small animals, a method of making said mobile stair system, and a method of producing elements of said mobile stair system. Said mobile stair system comprises a number of crossbars, a left side support and a right side support which jointly form a main frame for the mobile stair system. A cord is run through a number of holes in the left side support and in the right side support and through the number of crossbars, forming a number of stairs of the mobile stair system. The method of making the mobile stair system comprises connecting a number of crossbars between a left side support and a right side support to form a main frame, spreading a covering over the number of crossbars of the main frame, and connecting the number of crossbars, the left side support, the right side support and the covering by using a cord such that the covering serves as a number of stairs. The method of producing elements of a main frame of the mobile stair system by injection molding comprises using molds in forming said elements, pouring casting material into the molds, allowing the casting material to harden in the mold to form said elements, removing the precast elements from the mold, and finally covering the main frame by using a covering and a cord as described above.

17 Claims, 4 Drawing Sheets

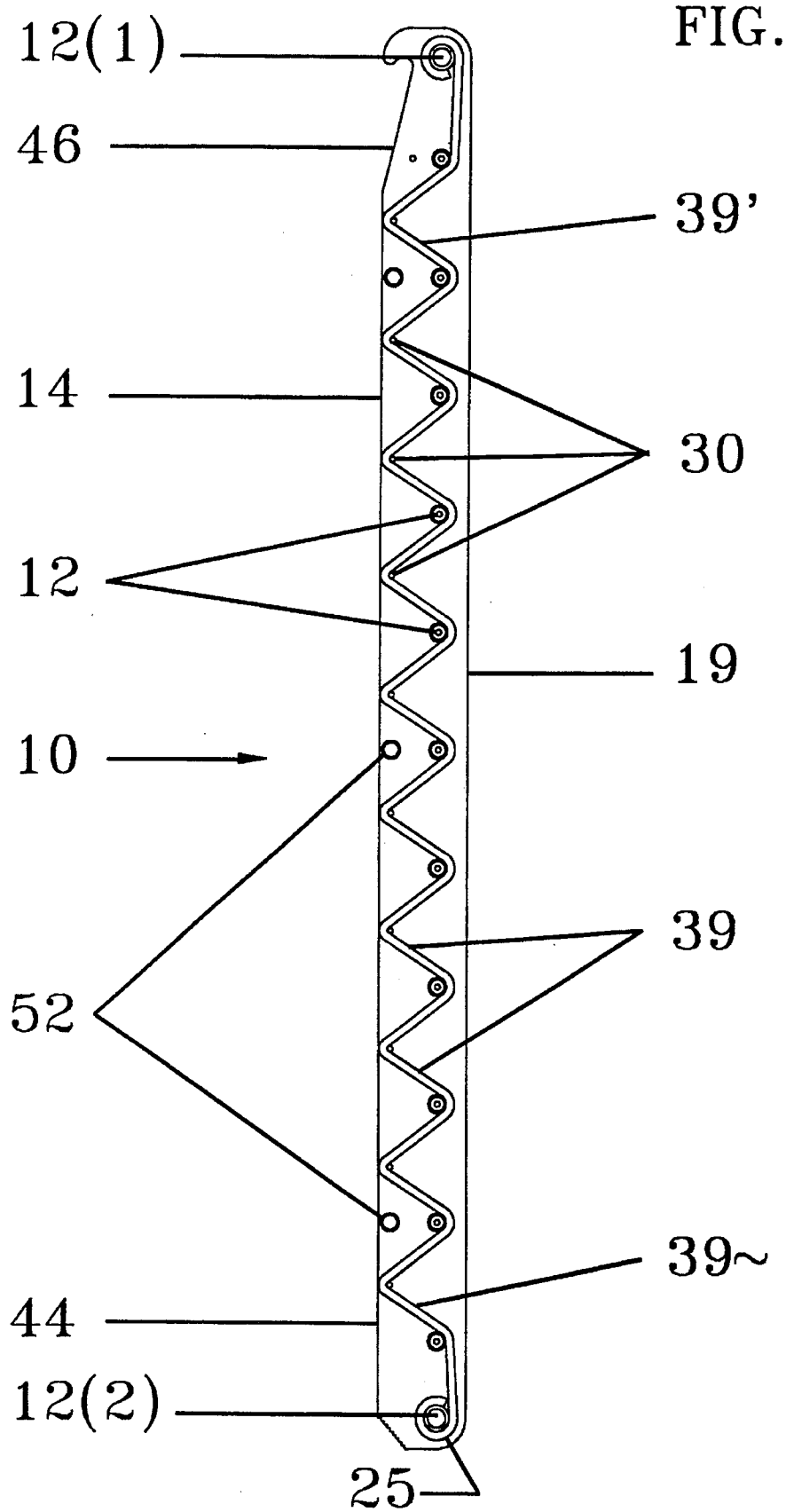

MOBILE STAIR SYSTEM FOR PETS AND ANIMALS, METHOD OF MAKING SAID MOBILE STAIR SYSTEM

BACKGROUND OF THE INVENTION

1. Field of the Invention

This invention relates to a mobile stair system for pets and other small animals, a method of making said mobile stair system, and a method of producing elements of said mobile stair system. Said mobile stair system is most preferably fabricated from rigid or semi-rigid material, including but not limited to rigid polyvinyl chloride (PVC), and is carpeted or covered with some pliable material comprising rubber for use in water. Said mobile stair system may be used by small or handicapped pets (comprising small or handicapped dogs, cats, birds and pigs) or other animals (hereafter referred to in combination as "pets"). The method of making the mobile stair system comprises connecting a number of crossbars between a left side support and a right side support to form a main frame, spreading a covering over the number of crossbars of the main frame, and connecting the number of crossbars, the left side support, the right side support and the covering by using a cord such that the covering serves as a number of stairs. The method of producing elements of a main frame of the mobile stair system comprises using molds in forming said elements, pouring casting material into the molds, allowing the casting material to harden in the mold to form said elements, and removing the precast elements from the mold, i.e. using injection molding.

2. General Background

The present invention relates to a mobile stair system for use by small or handicapped "pets", method of making said mobile stair system, and a method of producing elements of the main frame of said mobile stair system. Said mobile stair system is most preferably fabricated from rigid or semi-rigid material, comprising rigid polyvinyl chloride or heavy cardboard, through which a cord runs and which is carpeted or covered with any kind of pliable material. Light-weight and durable material are used in construction of the mobile stair system to make the mobile stair system easy to carry and long-lasting. In addition, the rigid or semi-rigid material used in fabricating said mobile stair system must be capable of supporting the weight of the "pet" standing or climbing thereon and shall be capable of being readily shaped to a desired configuration.

Currently used portable stairways have a wide variety of applications, applications ranging from construction to hunting. Heavier stairways, usually comprising concrete, are used in construction. Since such stairways often require concrete and are quite heavy, transportation and installation of such stairways are difficult tasks. Manufacturing such stairways is not often an easy task either. Some existing stairways do not provide a required or desired strength. Other stairways are enclosed by a railing to protect injuries due to falls off the side of the stairways. As a result, such stairways often are hard to manufacture, carry, install and use.

In order to simplify the manufacturing, the transportation, the installation and the utilization process of mobile stair systems, the present mobile stair system, the method of making the present mobile stair system and the method of producing elements of the main frame of the mobile stair system are recommended in the present invention.

3. Description of the Prior Art

In the past few years, there have been some improvements in the prior portable stairways, methods of making the same, and methods of producing elements of the same. A few patents have been recently registered which explain different stair systems, stairways, ladders, methods for making the same, and methods of producing elements of the same. Such patents disclose different types of stairways and ladders (comprising concrete stairways and metal ladders), different stair systems, different methods of making some of said stairways, ladders or stair systems, and different methods of producing elements of the same.

Bennett, U.S. Pat. No. 4,995,205, discloses a precast stair system, including a plurality of individually precast steps. The stair system comprises a tread portion and a riser portion, said riser portion being integrally connected to the tread portion and extending generally downward therefrom. One or more stringer elements are precast, independently of the steps, for supporting the steps. The steps are releasably fastened to each stringer element.

Brumbalough, U.S. Pat. No. 4,706,425, discloses a stair unit structure having at least one stair with a riser and a tread fabricated from rigid material such as fiberglass. A reinforcement member coextends along the width of the stair unit structure and is secured at each inside width by a suitable adhesive or any similar material. A flange member is preferably used close to the lowermost riser to secure the stair unit structure to a supporting structure. A turn-down member is preferably used near the rearward edge of the uppermost tread to provide added strength.

Yokomori, U.S. Pat. No. 4,034,525, discloses a construction of step members for building a stairway structure. The construction of each step member comprises a first vertically extending plate-like element provided at one end with a first rolled portion and a second horizontally extending plate-like element provided at one end with a second rolled portion. Fastening means are passed through the openings of the first and second rolled portion to connect the step members to parallel stringers.

Burton, U.S. Pat. No. 3,891,053, discloses a ladder to be mounted on a boat to facilitate a dog climbing into the boat from the water. The ladder comprises an adjustable base member detachably mountable on a supporting structure, a pivot means to be mounted on the base member, a ramp assembly to be pivotally mounted on a pivot pin, a base member including a pair of relatively adjustable base and clamp plates including parallel flanges, and adjustable means mounted on one of said flanges to clamp the base member thereto.

Hanson, U.S. Pat. No. 3,805,464, discloses a precast reinforced concrete integral staircase to be installed as a unit to span the space between two surfaces. The precast staircase is formed of a deep U-shaped elongated beam member with the arm portions of the "U" extending upwardly from the flat base of the "U" defining the stairs, said arm portions providing a supporting structure for the stairs.

Argraves et al., U.S. Pat. No. 3,706,170, discloses a pre-fabricated molded or precast stairway and method of making a prefabricated plastic stairway. In the execution of the invention, the necessary forms are made and into them the desired ingredients are introduced and allowed to set and cure, after which the molded units are removed and used to build the completed stairway. The prefabricated plastic stairway, in addition, has a facing representing brick, stone or other desired ornamental finish.

Each of the above mentioned patents discloses various features of a number of inventions. However, the known prior art suffers certain disadvantages which will be discussed.

SUMMARY OF THE INVENTION

A primary object of this invention is to provide a mobile stair system fabricated preferably from rigid or semi-rigid material capable of being readily moved.

Another object of this invention is to provide a mobile stair system that may be easily used by small or handicapped "pets" without requiring human assistance.

Another object of this invention is to provide a mobile stair system that is easily portable and light-weight, while possessing the necessary strength.

Still another object of this invention is to present a mobile stair system that is durable.

A further object of this invention is to provide a mobile stair system that is easily and quickly assembled and comprises relatively inexpensive elements.

An additional object of the invention is to provide a mobile stair system that comprises elements which are easily handled, preferably by one person, and which requires minimum space for transportation and storage.

Another object of the invention is to provide a mobile stair system which can be readily, easily and quickly installed, preferably by one person, within a small area of a supporting surface upon which the mobile stair system is to rest, and which can be secured to said supporting surface with a minimum of labor.

A further object of this invention is to provide a mobile stair system which may be manipulated after attachment to a supporting surface, without disturbing the supporting surface, so that the mobile stair system may be rearranged in another direction easily and quickly.

Another object of this invention is to provide a mobile stair system that has a lighting system or any other electrical device for notifying bystanders of position of the mobile stair system and for attracting "pets".

Still another object of this invention is to provide a mobile stair system that provides a relatively noise-free stair system.

Another object of this invention is to provide a method of making a mobile stair system that is fabricated preferably from rigid or semi-rigid material and that is covered with any type of pliable material.

A final object of this invention is to provide a method of producing elements of a mobile stair system by injection molding.

Additional objects and advantages of the invention will be set forth in part in a detailed description which follows, and in part will be obvious from the description, or may be learned by practice of the invention.

This invention provides a mobile stair system fabricated preferably from rigid or semi-rigid material, comprising polyvinyl chloride (PVC), and carpeted by a covering. The covering is most preferably made of a carpet-like material or any pliable material like rubber for decreasing slipping of "pets". If the mobile stair system is to be used in water, the covering preferably comprises a material similar to what is used in making water-ski vests or non-slipping rubber-like material. Said mobile stair system may be used by "pets", that are limited in heights in which such "pets" are capable of climbing or jumping, for climbing from one lower level to an elevated level without any human assistance.

Said mobile stair system comprises a number of crossbars connecting a right side support to a left side support, with said left side support being located at a distance apart from said right side support. Said number of crossbars, comprising a first crossbar, a last crossbar, a highest crossbar and a lowest crossbar, connects said left side support to said right side support, forming a main frame for the mobile stair system. Starting at a top portion of the left side support, a cord is run, after being knot tightly, from a first hole of a number of holes, said number of holes comprising the first hole, a following hole and the last hole, closest to an end of one side (i.e. preferably the end of an inner side) of the left side support, through said first hole in the left side support, to another side (i.e. an outer side) of the left side support. Then, the cord continues back to the inner side through the following hole of the number of holes in the left side support, running through the first crossbar of the number of crossbars attached to said following hole of the number of holes to the right side support. The cord emerges from a first hole of the number of holes that is closest to an end in the right side support to which said first crossbar is attached, and loops back through a following hole of the number of holes in the right side support. Next, the cord is run back towards the left side support, crossing over the covering, forming a first stair of a number of stairs, comprising the first stair and a last stair, of the mobile stair system. Thus, the cord is used to releasably interconnect the covering to the main frame of the mobile stair system, forming the number of stairs from the first stair to the last stair.

Similarly, starting at the top portion of the right side support, the cord may be run from one side, preferably from the inner side, of the right side support through the first hole of the number of holes in the right side support, to another side (i.e. the outer side) of the right side support. Then, the cord continues back through the following hole in the right side support, running through the first crossbar attached to the following hole, to the left side support. Then, the cord runs through the first hole in the left side support to which said first crossbar is attached, and loops back through the following hole in the left side support. Next, the cord goes back towards the right side support, crossing over the covering and forming the first stair of the mobile stair system. As described before, the cord is used to releasably interconnect the covering to the main frame of the mobile stair system, forming the number of stairs from the first stair to the last stair.

The left side support and the right side support have a bottom portion which is dipped in a rubber coating comprising naphtha, hexane, toluene and methyl ethyl ketone. Said rubber coating is used for decreasing the slippage of the mobile stair system. The top portion of the left side support and the top portion of the right side support preferably comprise a curved shape. Said curved shape of the top portion of the right side support and said curved shape of the top portion of the left side support assist the mobile stair system in gripping the elevated level in order to decrease slippage of the mobile stair system. In addition, the covering secured to the number of stairs is chosen to have a surface or a substance placed on said surface to assist in decreasing slippage of the "pet" thereon.

This invention also features a method of making a mobile stair system. Said method of making the mobile stair system comprises:

(a) using rigid or semi-rigid material to form elements of the mobile stair system, said elements comprising a number of crossbars, a left side support and a right side support;

(b) placing the number of crossbars horizontally in between the left side support and the right side support, with the left side support and the right side support being vertical to the number of crossbars and having leveled top portions and leveled bottom portions, and connecting the number of crossbars to the left side support and to the right side support to form a main frame for the mobile stair system;

(c) spreading a covering over the number of crossbars of the main frame; and (d) connecting the covering to the main frame by using a cord and by passing the cord through a number of holes in the left side support and in the right side support, through the number of crossbars, and over the covering;

such that the covering, when connected to and supported by the main frame, serves as a number of stairs for the mobile stair system.

The rigid or semi-rigid material may be cut into a desired size and shape. However, cutting rigid or semi-rigid material, comprising rigid PVC, into the desired size and shape may be time-, labor-, and material-consuming. Another method that may be used for producing elements of a main frame of a mobile stair system of desired size and shape is injection molding which uses molds in forming elements of said mobile stair system, said elements comprising right side supports, left side supports, a number of crossbars, a number of brace bars, and caps. For each category of elements of the mobile stair system, the mold comprises an open upper end for receiving casting material, a first cavity portion for forming the category of elements, and a second cavity portion that is connected to and depends from the first cavity portion. There are means such as filler elements and movable walls for adjusting the sizes of the first and second cavity portions to adjust the sizes of the elements. The casting material is allowed to harden in the mold to form the main frame. The precast elements are then removed from the mold, ready to be interconnected to form the mobile stair system. Then steps (c) and (d) of the above method for making a mobile stair system is repeated for spreading the covering over the number of crossbars of the main frame and for connecting the covering to the main frame by using a cord after the elements are ready to use.

As can be seen, the stair structure is of simple construction and economical, since it can be built from a relatively small amount of material with little labor.

It is to be understood that the descriptions of this invention are exemplary and explanatory, but are not restrictive, of the invention. Other objects and advantages of this invention will become apparent from the following specification and the accompanying drawings.

BRIEF DESCRIPTION OF DRAWINGS

The accompanying drawings, which are incorporated in and constitute a part of this specification, illustrate examples of preferred embodiments of the invention and, along with the description, serve to explain the principles of the invention. The same characters of reference are employed in the drawings to indicate corresponding similar parts throughout the several figures of the drawing.

FIG. 4 is a cross-sectional view of the preferred embodiment of the mobile stair system in FIG. 1.

DETAILED DESCRIPTION OF THE PREFERRED EMBODIMENT

Figure 1:
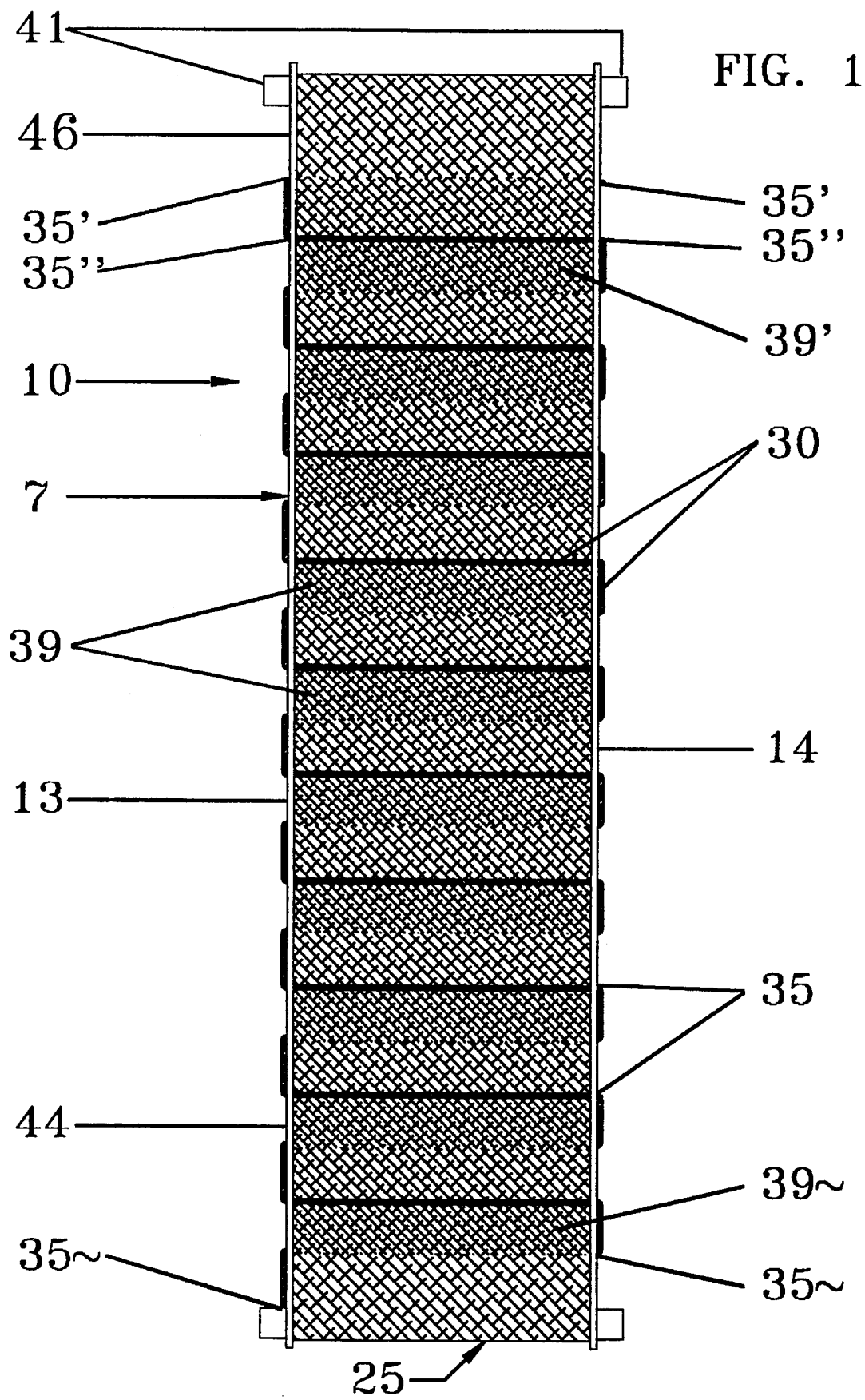
FIG. 1 is a front view of a preferred embodiment of the mobile stair system.
Figure 2:
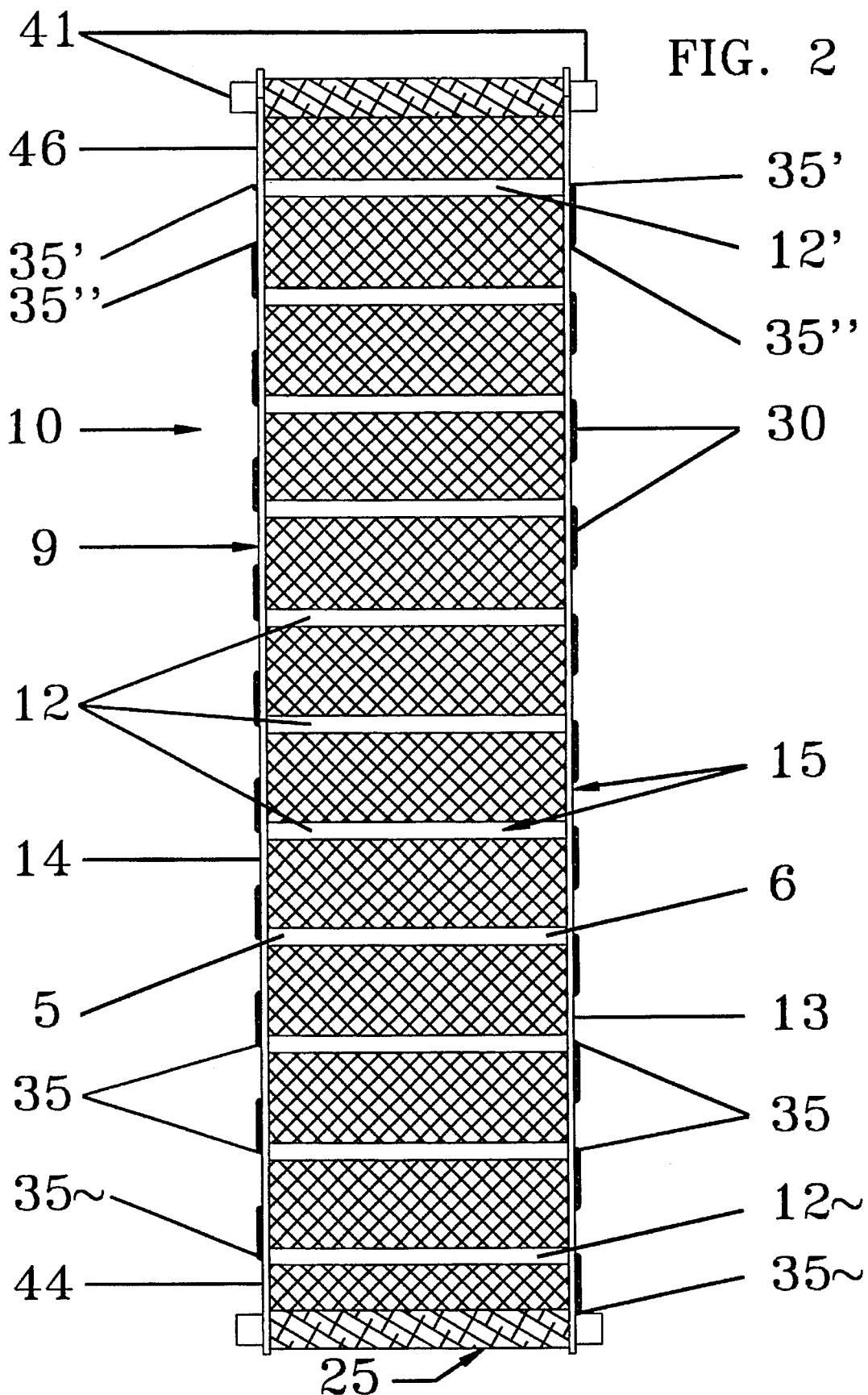
FIG. 2 is a back view of the preferred embodiment of the mobile stair system in FIG. 1.
Figure 3:
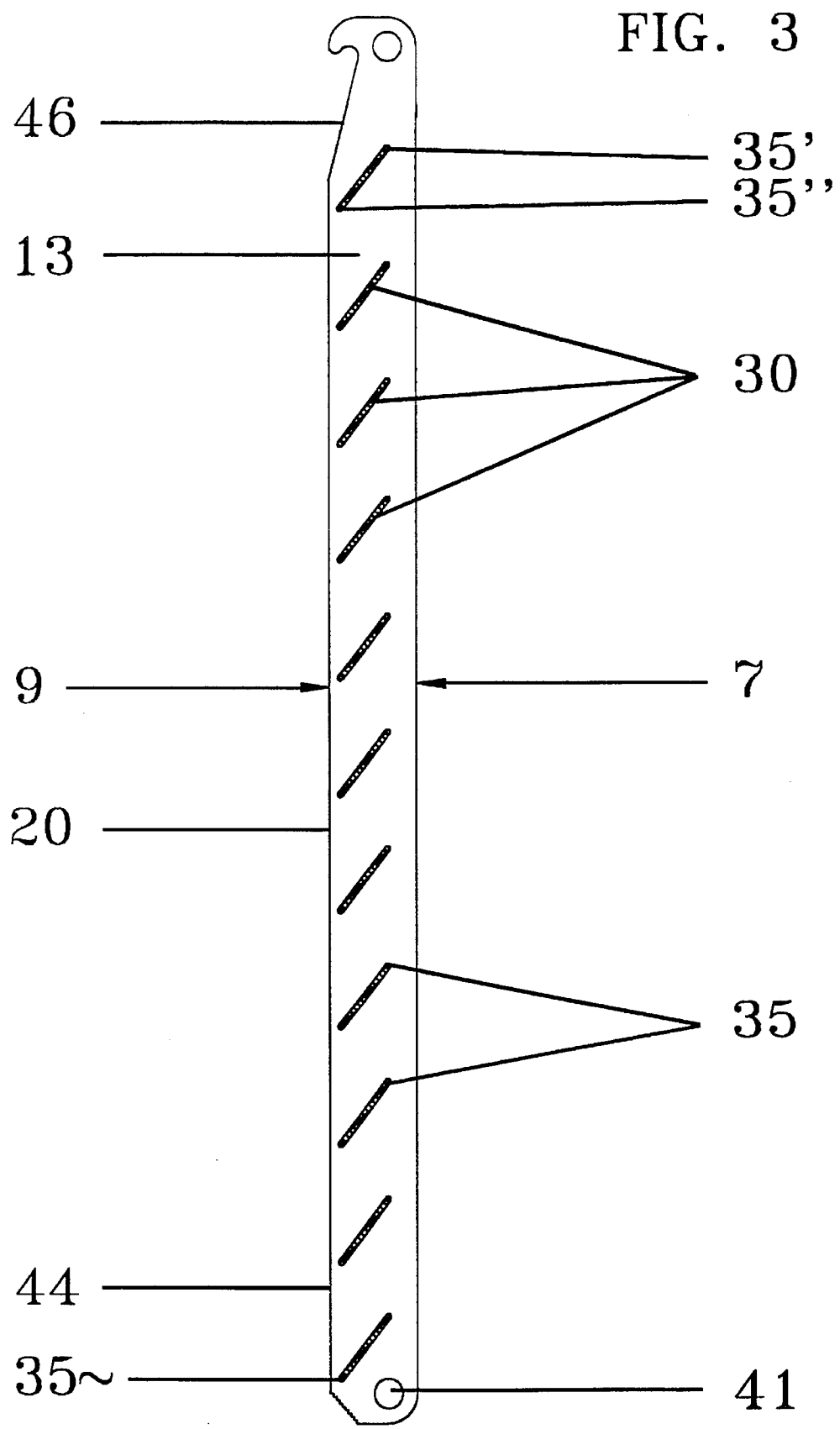
FIG. 3 is a side view of the preferred embodiment of the mobile stair system in FIG. 1.

A preferred embodiment of the present invention is illustrated in the attached drawings, FIGS. 1–4. The drawings illustrate a mobile stair system 10 that is fabricated from rigid or semi-rigid material (preferably from rigid polyvinyl chloride (PVC)) and that is carpeted by a covering 25. Said mobile stair system 10 may be used by "pets" for climbing from a lower level to an elevated level. Using said mobile stair system 10, said "pets" are capable of climbing up from the lower level into the elevated level, comprising a bed, a veterinarian table, a hospital bed, and a kennel, and are capable of rising out of a swimming pool or from a body of water into a boat without any human assistance.

Said mobile stair system 10 has a front 7 and a back 9. The mobile stair system 10 comprises a number of crossbars 12, comprising a first crossbar 12', a last crossbar 12~, a highest crossbar 12(1) and a lowest crossbar 12(2), located on the back 9 between a right side support 14 and a left side support 13. (The highest crossbar 12(1) and the lowest crossbar 12(2) are shown only on FIG. 4.) Said number of crossbars 12 has a first end 5 and a second end 6. Said right side support 14 and said left side support 13 each has a top portion 46 and a bottom portion 44. Said number of crossbars 12 preferably runs horizontally, connecting the left side support 13 to the right side support 14, said left side support 13 located at a distance from said right side support 14. Also, the top portion 46 of the left side support 13 is leveled with the top portion 46 of the right side support 14 and the bottom portion 44 of the left side support 13 is leveled with the bottom portion 44 of the right side support 14. As shown on FIG. 2, said number of crossbars 12 connect said left side support 13 to said right side support 14, forming a main frame 15 for the mobile stair system 10. Said left side support 13 and said right side support 14 are preferably of an equal length.

The mobile stair system 10 has a length most preferably ranging from approximately 2 ft. to approximately 8 ft. Said number of crossbars 12 are most preferably approximately ¼ in. to approximately 1 in. electrical rigid PVC pipes and have a length most preferably ranging from approximately 10 in. to approximately 18 in. The highest crossbar 12(1) and the lowest crossbar 12(2) of said number of crossbars 12 which are longer than a distance formed between the left side support 13 and the right side support 14, are capped on the first end 5 and on the second end 6 using small, tubular caps 41, after being attached to the left side support 13 and to the right side support 14, respectively. A lighting device or any other small electrical device (not shown in FIGS. 1–4) for notifying bystanders of presence of the mobile stair system 10 or for attracting pets may be used and connected to either cap 41. Said electrical device may be battery-operated, with batteries placed under either cap 41. The device may optionally have a switch for being turned on and off, with the switch placed over said cap 41. The lighting device would be placed in an opening in either cap 41 such that upon turning on of the switch, the cap 41 will be lighted and act as a notification for bystanders of presence of the mobile stair system 10. The left side support 13 and the right side support 14 most preferably comprise rigid PVC foam board having a depth ranging from about 6 min. to about 9 min. and are preferably cut into strips having a length ranging from about 2 ft. to about 8 ft. and a width ranging from approximately 3 in. to approximately 6 in. The number of crossbars 12 are used to connect the left side support 13 to the right side support 14, forming a distance most preferably ranging from approximately 10 in. to approximately 18 in. between the left side support 13 and the right side support 14. The mobile stair system 10 has a width which depends on length of said number of crossbars 12, and a length which depends on length of the left side support 13 and of the right side support 14. The length of the left side support 13 and the length of the right side support 14 may be varied to change the length of the mobile stair system 10.

The main frame 15 is dipped twice into flexible rubber coating in order to minimize damages to the "pets" or to bystanders and in order to minimize slippage as much as possible. Said rubber coating comprises naphtha, hexane, toluene and methyl ethyl ketone. Said rubber coating is used for decreasing the slippage of the mobile stair system 10.

In order to form a number of stairs 39, comprising a first stair 39' and a last stair 39~, starting at the top portion 46 of the left side support 13, which has a number of holes 35, comprising a first hole 35', a following hole 35" and a last hole 35~, a cord 30 is run from one side (preferably inner side 19) of the left side support 13, through the first hole 35' in the left side support 13 to another side (i.e. an outer side 20) of the left side support 13. The number of holes 35 are preferably drilled in the left side support 13 and in the right side support 14. Then, the cord continues back, while descending, through the following hole 35" in the left side support 13, passing through the first crossbar 12' connecting the left side support 13 to the right side support 14. Preferably starting at the top portion 46 of the right side support 14, the cord 30 runs through the first hole 35' in the right side support 14 to which said first crossbar 12' is attached, looping back and descending through the following hole 35" in the right side support 14, and going back towards the left side support 13, crossing above the covering 25, forming the first stair 39' of the mobile stair system 10. The covering 25 is secured on the number of crossbars 12. Thus, if the cord 30 is used to secure the covering 25 on the number of stairs 39, the mobile stair system 10 is releasably interconnected. Similarly, the cord 30 is run down until the last hole 35~ is reached, forming the last stair 39~, where the cord 30 is knot.

On the other hand, starting at the top portion 46 of the right side support 14, the cord 30 may be run from one side (preferably the inner side 19) of the right side support 14, through the first hole 35' in the right side support 14 to another side (i.e. the outer side 20) of the right side support 14. Then, the cord is run back, while descending, through the following hole 35" in the right side support 14, passing through the first crossbar 12' to the left side support 13 (preferably at the top portion 46 of the left side support 13), connecting the left side support 13 to the right side support 14. The cord 30 then runs through the first hole 35' in the left side support 13 to which said first crossbar 12' is attached, looping back and descending through the following hole 35" in the left side support 13 and going back towards the right side support 14, crossing above the covering 25, forming the first stair 39' of the mobile stair system 10. As described above, the cord 30 is run down until the last hole 35~ is reached where the cord 30 is knot.

Other combinations for connecting the left side support 13 to the right side support 14 by cord 30 are possible as well. For example, starting from the top portion of the right side support 14, the cord 30 may be run from the outer side 20 of the right side support 14 through the first crossbar 12' to the top portion 46 of the left side support 13. The cord 30 then runs through the first hole 35' in the left side support 13 to which said first crossbar 12' is attached and continues, as described in the previous examples, through the following hole 35" in the left side support 13. Then, the cord 30 is drawn back towards the right side support 14, crossing above the covering 25 and forming the first stair 39'. Similar to other examples, the cord 30 is run down until the last hole 35~ is reached where the cord 30 is knot.

Similarly, starting at the top portion 46 of the left side support 13, the cord 30 may be run from the outer side 20 of the left side support 13 through the first hole 35' of the left side support 13 and through the first crossbar 12'. The cord 30 then continues through the first hole 35' in the right side support 14 to which said first crossbar 12' is attached, looping back and descending through the following hole 35" in the right side support 14, going back towards the left side support 13, crossing above the covering 25, and forming the first stair 39'. In a similar fashion., the cord 30 is run down until the last hole 35~ is reached, forming the last stair 39~, where the cord 30 is knot. Other combinations are possible by running the cord 30 from the bottom portion 44 of the left side support 13 or the bottom portion 44 of the right side support 14 towards the top portion 46 similar to the above stated examples, with a main difference of starting from the bottom portion 44 and running upwards. Other combinations are available as well, depending upon several factors, said factors comprising where the cord 30 is knot at the top portion 46 and at the bottom portion 44, what pattern is desired for the mobile stair system 10, and size of the number of stairs 39 desired.

Although any type of strong rope or cord may be used, the cord 30 preferably comprises cotton or polysash and has a diameter ranging most preferably from approximately 3⁄16 in. to approximately 1 in. The number of holes 35 are drilled in the left side support 13 and in the right side support 14, preferably vertical distances apart, said vertical distances of drilling ranging most preferably from about 3 in. to about 8 in. The number of holes 35 may also be drilled at angled distances, said angled distances of drilling ranging most preferably from approximately 2 in. to approximately 6 in.

The left side support 13 and the right side support 14 each has the bottom portion 44 opposite to the top portion 46. The bottom portion 44 of the left side support 13 and the bottom portion 44 of the right side support 14 most preferably comprise a rubber coating for decreasing the slippage of the mobile stair system 10. The top portion 46 of the left side support 13 and the top portion 46 of the right side support 46 preferably comprise a curved shape, with the curved shaped being located on back of the left side support 13 and of the right side support 14. Said curved shape of the top portion 46 of the left side support 13 and of the right side support 14 assists the mobile stair system 10 in gripping the elevated level. In addition, the covering 25 secured to the number of stairs 39 is chosen to have a rough surface to assist in decreasing slippage of the "pet" thereon.

Additionally, it is most preferable to use a number of brace bars 52 (as shown on FIG. 4) to support the mobile stair system 10 from behind. Said number of brace bars 52 are most preferably attached behind the covering 25 to the left side support 13 and to the right side support 14 of the mobile stair system 10, thus, becoming part of the main frame 15. In addition, no cord passes through the number of brace bars 52 and the number of brace bars 52 are most preferably placed a farther distance apart from one another than the number of crossbars 12 are. Said number of brace bars 52 serve mostly as reinforcers, giving reinforcement to the number of stairs 39 and to the main frame 15. Most preferably, said number of brace bars 52 have the dimensions of the number of crossbars 12. The number of brace bars 52 is proportional to the length of the main frame 15.

The most preferred number of brace bars 52 for the main frame 15 for pets is three, with said number of brace bars 52 being most preferably equally distanced.

Caps 41 are used to close the first end 5 and the second end 6 of the highest crossbar 12(1) of the number of crossbars 12 on the outer side 20 of the left side support 13 and on the outer side 20 of the right side support 14, respectively. Similarly, caps 41 are used to close the first end 5 of the lowest crossbar 12(2) of the number of crossbars 12 on the outer side 20 of the left side support 13 and on the outer side 20 of the right side support 14. Either of said caps 41 may contain a lighting device or any such electrical device for notifying bystanders of location of the mobile stair system 10 or for attracting the "pets". Glue is applied on surfaces surrounding said number of holes 35 to tightly hold the number of crossbars 12 in place between the right side support 14 and the left side support 13. Finally, glue is applied between one end of the covering 25 and the highest crossbar 12(1) of the number of crossbars 12 and between another end of the covering 25 and the lowest crossbar 12(2) of the number of crossbars 12 to prevent the covering 25 from slippage or movement.

The mobile stair system 10 has several applications. The mobile stair system 10 is used by placing the top portions 46 of said mobile stair system 10 on the elevated level such that the top portions 46 of the left side support 13 and of the right side support 14 rest securely against the elevated level. The top portions 46 of the left side support 13 and of the right side support 14 should rest such that the top portions 46 of the mobile stair system 10 are almost level with the elevated level. The mobile stair system 10 should also be placed such that the bottom portions 44 of the left side support 13 and of the right side support 14 of the mobile stair system 10 rest securely on the lower level. The "pet" is then able to comfortably walk up onto the elevated level on which the mobile stair system 10 rests, or vice versa walk down to the lower level from that elevated level. Similarly, when the mobile stair system 10 is used for assisting "pets" to emerge from or enter the body of water, if properly placed, the top portions 46 of the mobile stair system 10 are secured to a top horizontal rim of a swimming pool or a boat. Once the "pet" desires to emerge, it may climb up the mobile stair system 10 onto the boat or out of the swimming pool without any human assistance.

The invention also illustrates a method of making a mobile stair system 10. The method of making the mobile stair system 10 comprises:

(a) using rigid or semi-rigid material to form elements of the mobile stair system 10, said elements comprising a number of crossbars 12, a left side support 13 and a right side support 14;

(b) placing the number of crossbars 12 horizontally in between the left side support 13 and the right side support 14, with the left side support 13 and the right side support 14 being vertical to the number of crossbars 12 and having leveled top portions 46 and leveled bottom portions 44, and connecting the number of crossbars 12 to the left side support 13 and to the right side support 14 in order to form a main frame 15 of the mobile stair system 10;

(c) spreading a covering 25 over the number of crossbars 12 of the main frame 15; and (d) connecting the covering 25 to the main frame 15 by using a cord 30 and by passing the cord 30 through a number of holes 35 in the left side support 13 and in the right side support 14, through the number of crossbars 12, and over the covering 25;

such that the covering 25, when interconnected by the cord 30 with the main frame 15, serves as a number of stairs 39 for the mobile stair system 10.

Preferably starting from a top portion 46 of the left side support 13, the cord 30 is run from one side (i.e. an inner side 19) of the left side support 13, through the first hole 35' in the left side support 13 to another side (i.e. an outer side 20) of the left side support 13. Then, the cord 30 is run back through a following hole 35" in the left side support 13, passing through the first crossbar 12' to the right side support 14. The cord 30 is run through the first hole 35' in the right side support 14 (preferably from the top portion 46 of the right side support 14) to which said first crossbar 12' is attached, is looped back, while descending, through the following hole 35" in the right side support 14, and is run back towards the left side support 13, crossing above the covering 25, forming the first stair 39' of the mobile stair system 10. The cord 30 is run down similarly until the last hole 35~ is reached where the cord 30 is knot, forming the number of stairs 39 of the mobile stair system 10.

Similarly, starting from the top portion 46 of the right side support 14, the cord 30 may be run from one side (preferably the inner side 19) of the right side support 14, through the first hole 35' in the right side support 14 to another side (i.e. the outer side 20) of the right side support 14. Then, the cord 30 is run back, while descending, through the following hole 35" in the right side support 14, passing through the first crossbar 12' to the left side support 13. The cord 30 is then run through the first hole 35' in the left side support 13 to which said first crossbar 12' is attached, looping back and descending through the following hole 35" in the left side support 13, and going back towards the right side support 14, following a zig-zagging pattern until the last hole 35~ is reached where the cord 30 is knot. This zig-zagging pattern is continued down the main frame 15 back and forth until the number of stairs 39 is formed and the mobile stair system 10 is completed. The number of crossbars 12 are glued to surfaces surrounding the number of holes 35 of the left side support 13 and of the right side support 14 such that the number of crossbars 12 are held tightly in place, forming an important part of the main frame 15. Also, a number of brace bars 52 may be attached to the main frame 15 from behind to provide a higher strength for and to support the main frame 15. Similarly, the cord 30 may be run from the bottom portion 44 of the left side support 13 or the bottom portion 44 of the right side support 14. Other combinations are possible as well, depending upon where the cord 30 starts running and what pattern is desired in forming the mobile stair system 10.

The rigid or semi-rigid material may be cut into a desired size and shape. However, cutting rigid or semi-rigid material, comprising rigid PVC, into the desired size and shape may be time-, labor-, energy- and material-consuming. Another method that may be used for producing elements of a mobile stair system 10 of desired size and shape is using molds in forming elements of said mobile stair system 10, said elements comprising right side supports 14, left side supports 13, a number of crossbars 12, a number of brace bars 52, and caps 41. For each category of elements of the mobile stair system 10, the mold comprises an open upper end for receiving casting material, a first cavity portion for forming the category of elements, and a second cavity portion that is connected to and depends from the first cavity portion. Casting material, comprising PVC, is poured into the molds. There are means such as filler elements and movable walls for adjusting the sizes of the first and second cavity portions to adjust the sizes of the elements. The casting material is allowed to harden in the mold to form each of the elements. The precast elements are then removed from the molds and the elements are interconnected to form the main frame 15 of the mobile stair system 10.

As can be seen, the method of making said mobile stair system 10 is simple and is, therefore, economical, since it can be built from a relatively small amount of material and labor. Also, as shown from the various embodiments described above, the elements can be moved to any desired location, even to a small space or area inside a building or in a trunk of a car, and can be very easily assembled and built within the small area inside the building or in the trunk or within a small area of a supporting surface upon which the mobile stair system 10 is to rest. One advantage of the inventions is the ease with which the mobile stair system 10 is assembled and solidly fastened by means of the cord 25. Another advantage is that the elements can be assembled into the mobile stair system 10 without any welding means or other tools or devices. Only some labor is needed in assembling the mobile stair system 10. A further advantage is that the mobile stair system 10 may be assembled at any time and at any location without limitations. No coatings for protection from rusting is needed. Still another advantage is that the mobile stair system 10 provides a noise-free stair system, which is probably very much appreciated by the owner of "pets", particularly at night.

What is claimed as invention is:

1. An interconnected mobile stair system comprising:

a. a right side support and a left side support each having an inner side, an outer side, a top portion and a bottom portion, and a number of holes, comprising a first hole, a following hole and a last hole, therein;

b. a number of crossbars, comprising a first crossbar, a last crossbar, a highest crossbar and a lowest crossbar, horizontally connecting said right side support to said left side support and attached to said right side support and to said left side support to form a main frame for the mobile stair system, with said left side support located at a distance apart from said right side support, with the left side support having a top portion leveled with the top portion of the right side support and with the left side support having a bottom portion leveled with the bottom portion of said right side support;

c. a covering spread over said number of crossbars to form a number of stairs comprising a first stair and a last stair, with the covering located in the distance between said right side support and said left side support and glued at each end to the highest crossbar and to the lowest crossbar; and d. a cord;

such that the cord runs from the inner side of the left side support, through the first hole of the number of holes in the left side support, to the outer side of the left side support, and then runs back, descending through the following hole of the number of holes in the left side support, passing through the first crossbar of the number of crossbars to the right side support, and then running through the first hole of the number of holes in the right side support, looping back and descending through the following hole of the number of holes in the right side support, and going back toward the left side support, crossing horizontally above the covering and securing the covering on said crossbar to form the first stair of the number of stairs of the mobile stair system; and such that the cord continues to run similarly down the main frame in order to form the last stair and the number of stairs of the mobile stair system, and to form said mobile stair system.

2. The mobile stair system of claim 1, wherein the cord starts to run from the outer side of the right side support through the first hole of the number of holes in the right side support, to the inner side of the right side support, passing through the first crossbar of the number of crossbars connecting the right side support to the left side support, and then running through the first hole of the left side support, looping back and descending through the following hole of the number of holes in the left side support, and going back toward the right side support, crossing horizontally above the covering and securing the covering on said first crossbar to form the first stair of the number of stairs of the mobile stair system, with the cord continuing to run similarly down the main frame in order to form the number of stairs of the mobile stair system.

3. The mobile stair system of claim 1, wherein the cord starts to run from the inner side of the right side support, through the first hole of the number of holes in the right side support, to the outer side of the right side support, and then back and descending through the following hole of the number of holes in the right side support, passing through the first crossbar of the number of crossbars to the left side support, and then running through the first hole of the number of holes in the left side support, looping back and descending through the following hole of the number of holes in the left side support and going back towards the right side support, crossing above the covering, forming the first stair of the number of stairs of the mobile stair system, and continuing to run similarly down the main frame in order to form the number of stairs of the mobile stair system.

4. The mobile stair system of claim 3, wherein the cord starts to run from the outer side of the left side support through the first hole of the number of holes in the left side support, to the inner side of the left side support, passing through the first crossbar of the number of crossbars connecting the left side support to the right side support, and then running through the first hole of the number of holes in the right side support to the outer side of the right side support, turning down and descending through the following hole of the number of holes of the right side support, going back towards the left side support, crossing above the covering, forming the first stair of the number of stairs of the mobile stair system, and continuing to run similarly down the main frame to form the mobile stair system.

5. The mobile stair system of claim 1, wherein the mobile stair system assists small or handicapped pets, comprising small or handicapped dogs, cats, birds and pigs, or other animals to climb from a lower level to an elevated level, such as egressing from a body of water onto a structure on which the mobile stair system is supported or climbing from ground to a bed, or for descending from the elevated level to the lower level, with:

a. the bottom portion of the left side support and the bottom portion of the right side support comprising a rubber-like material, for decreasing slippage of the mobile stair system; and b. the top portion of the left side support and the top portion of the right side support comprising a curved shape, said curved shape of the top portion of the left side support and said curved shape of the right side support assisting the mobile stair system in gripping the elevated level and in decreasing slippage of the mobile stair system;

such that the mobile stair system is used by placing the top portion of the left side support and the top portion of the right side support of said mobile stair system on the elevated level, with the top portion of the right side support and the top portion of the left side support of the mobile stair system resting securely against and being level with the elevated level; and such that the mobile stair system is placed in a manner that the bottom portion of the left side support and the bottom portion of the right side support of the mobile stair system rest securely on the lower level, in order to allow the pet or other animal, whether handicapped or small, to comfortably walk up onto the elevated level on which the mobile stair system rests, walk down to the lower level from that elevated level, emerge from a body of water or enter into the body of water.

6. The mobile stair system of claim 1, wherein the mobile stair system comprises a number of brace bars to support the mobile stair system from behind, with said number of brace bars being attached, behind the covering, to the left side support and to the right side support of the mobile stair system, thus, becoming part of the main frame and serving as a reinforcement for the number of stairs and for the main frame.

7. The mobile stair system of claim 1, wherein:
  a. the number of crossbars are approximately ¼ in. to approximately 1 in. electrical rigid polyvinyl chloride (PVC) pipes that have a length ranging from approximately 10 in. to approximately 18 in.;
  b. the left side support and the right side support comprise rigid polyvinyl chloride (PVC) foam board, with the distance between the left side support and the right side support preferably ranging from approximately 10 in. to approximately 18 in.;
  c. the cord comprises cotton or polysash and has a diameter ranging from approximately 3/16 in. to approximately 1 in.; and
  d. the mobile stair system has a length ranging from approximately 2 ft. to approximately 8 ft.

8. The mobile stair system of claim 1, wherein the highest crossbar and the lowest crossbar of said number of crossbars are covered by caps on a first end and on a second end, after being attached to the left side support and to the right side support.

9. The mobile stair system of claim 1, wherein the mobile stair system has a width which is proportional to the distance between said left side support and said right side support, and a length which is proportional to the length of the left side support and is proportional to the length of the right side support.

10. The mobile stair system of claim 1, wherein an electrical device comprising a lighting device is attached to either cap of the mobile stair system, said electrical device being located inside the cap, with a switch located on said cap and an opening in the cap through which light or noise can exit.

11. A method of making a mobile stair system, said method comprising:
  a. using rigid or semi-rigid material to form elements of the mobile stair system, said elements comprising a number of crossbars, comprising a first crossbar, a last crossbar, a highest crossbar and a lowest crossbar, a left side support and a right side support each having a number of holes comprising a first hole, a following hole and a last hole;
  b. placing the number of crossbars horizontally between the left side support and the right side support, with the left side support and the right side support being vertical to the number of crossbars and having leveled top portions and leveled bottom portions, and connecting the number of crossbars to the left side support and to the right side support to form a main frame for the mobile stair system;
  c. spreading a covering over the number of crossbars of the main frame and gluing each end of the covering to the highest crossbar and to the lowest crossbar of the number of crossbars; and
  d. connecting the covering to the main frame by using a cord and by passing the cord, through a number of holes in the left side support and in the right side support, through the number of crossbars and over the covering;

such that the covering, when connected to the main frame, serves as a number of stairs, comprising a first stair and a last stair, for the mobile stair system.

12. The method of making the mobile stair system of claim 11, wherein a cord is run from an inner side of the left side support, through the first hole of the number of holes in the left side support, to an outer side of the left side support, and then back and descending through the following hole of the number of holes in the left side support, passing through the first crossbar of the number of crossbars to the right side support, with the cord then being run through the first hole of the number of holes in the right side support, looped back and descended through the following hole of the number of holes in the right side support, and being turned back towards the left side support, crossed above the covering to form the first stair of the number of stairs of the mobile stair system and continued to be run down the main frame until the last stair of the number of stairs and the mobile stair system are formed.

13. The method of making the mobile stair system of claim 11, wherein the cord is run from the inner side of the right side support, through the first hole of the number of holes in the right side support, to the outer side of the right side support, and then back and descending through the following hole of the number of holes in the right side support, passing through the first crossbar of the number of crossbars to the left side support, with the cord then being run through the first hole of the number of holes in the left side support, looped back and descended through the following hole of the number of holes in the left side support, and being turned back towards the right side support, crossed above the covering to form the first stair of the number of stairs of the mobile stair system, and continued to be run down the main frame until the number of stairs is formed.

14. The method of making the mobile stair system of claim 11, wherein said method further comprises using attachment methods, including but not limited to gluing, such that the number of crossbars are attached to surfaces surrounding the number of holes in the left side support and to surfaces surrounding the number of holes in the right side support in order that the number of crossbars are held tightly in place when the number of crossbars are placed between the left side support and the right side support.

15. The method of making the mobile stair system of claim 11, wherein the method further comprises placing a cap on a first end and on a second end of the highest crossbar and of the lowest crossbar of said number of crossbars, after said highest crossbar and said lowest crossbar of the number of crossbars are placed between and attached to the left side support and to the right side support and attaching the top portion of the covering and the bottom portion of the covering to the highest crossbar and to the lowest crossbar, respectively.

16. The method of making the mobile stair system of claim 15, wherein an electrical device, comprising a lighting device, is attached to either cap, with said electrical device being located inside said cap and an opening available for exit of noise or light for notifying bystanders of location of the mobile stair system.

17. The method of making the mobile stair system of claim 11, wherein the method further comprises using a number of brace bars to support the mobile stair system from behind the covering, and attaching said number of brace bars between the left side support and the right side support behind the covering of the mobile stair system.

* * * * *